United States Patent [19]

Itomitsu et al.

[11] Patent Number: 4,945,511

[45] Date of Patent: Jul. 31, 1990

[54] IMPROVED PIPELINED PROCESSOR WITH TWO STAGE DECODER FOR EXCHANGING REGISTER VALUES FOR SIMILAR OPERAND INSTRUCTIONS

[75] Inventors: Fujio Itomitsu; Toyohiko Yoshida, both of Itami, Japan

[73] Assignee: Mitsubishi Denki Kabushiki Kaisha, Tokyo, Japan

[21] Appl. No.: 371,961

[22] Filed: Jun. 27, 1989

[30] Foreign Application Priority Data

Jul. 4, 1988 [JP] Japan ................................. 63-166307

[51] Int. Cl.$^5$ ................................................ G06F 9/00
[52] U.S. Cl. ...................................... 364/900; 364/955; 364/948.3; 364/946.2
[58] Field of Search ................................ 364/200, 900

[56] References Cited

U.S. PATENT DOCUMENTS

| | | | |
|---|---|---|---|
| 4,586,130 | 4/1986 | Butts, Jr. et al. | 364/200 |
| 4,709,324 | 11/1987 | Kloker | 364/200 |
| 4,812,971 | 3/1989 | Butts, Jr. et al. | 364/200 |

Primary Examiner—Gareth D. Shaw
Assistant Examiner—John G. Mills
Attorney, Agent, or Firm—Townsend and Townsend

[57] ABSTRACT

A pipelined processor to improve the efficiency of conventional pipelined instruction processing including a two stage instruction decoder which converts sets of similar conventional instructions having the general formats: "MOV: A R1 R2" and "MOV: B R1 R2" where the letter fields A,B etc. indicate the direction of data transfer between the registers, R1, R2; into a single format instruction which can be processed by one microprogram. The first stage decoder processes one instruction intact and generates an intermediate code for the remaining format instruction. The second stage decoder utilizes the intermediate code to specify the direction of transfer by reversing the sequence of register numbers in the instruction not processed intact by the first stage. The resulting transfer instructions have the same format and thus require one, rather than two, microprograms for execution, making the pipelined processor more efficient.

1 Claim, 13 Drawing Sheets (SERIAL BIT NUMBER)

```
0       7 8      15 16      23 24      31
```

(BIT NUMBER IN EACH BYTE)

```
0       7 0      7 0      7 0      7
```

```
  N        N+1       N+2       N+3
```

(ADDRESS)

```
←LOW ADDRESS            HIGH ADDRESS→
←MSB SIDE                   LSB SIDE→
     →→DIRECTION OF READ INSTRUCTION→→
```

BYTE:    0            1         2  ——— N+2-1

BYTE:    0      .     1

A FORMAT

[MOV:A   SRC/Reg DST/Mem]

INSTRUCTION CODE

B FORMAT

[MOV:B   SRC/Mem DST/Reg]

INSTRUCTION CODE

+ : SPECIFYING A OR B FORMAT
** : OPERATION CODE (SERIAL BIT NUMBER)

```
0       7 8      15 16     23 24      31
```

(BIT NUMBER IN EACH BYTE)

```
0       7 0       7 0       7 0        7
┌──────┬──┬────────┬──────┬──┬────────┐
│------│MM│bbbbbbbb│------│RR│aaaaaaaa│
└──────┴──┴────────┴──────┴──┴────────┘
   N       N+1       N+2       N+3
```

(ADDRESS)

←LOW ADDRESS               HIGH ADDRESS→
←MSB SIDE                      LSB SIDE→

→→DIRECTION OF READ INSTRUCTION→→

Fig. 19

(Sh) | 00 | 1101 | disp:16 |

(Ea) | 0000 | 1101 | disp:16 |

(Sh) | 00 | 1110 | disp:32 |

(Ea) | 0000 | 1110 | disp:32 |

(Ea) | 0110 | Rn | CHAINED ADDRESSING MODE | --- | CHAINED ADDRESSING MODE |

BASIC INSTRUCTION FORMAT OF DATA
PROCESSOR OF THIS INVENTION

IMPROVED PIPELINED PROCESSOR WITH TWO STAGE DECODER FOR EXCHANGING REGISTER VALUES FOR SIMILAR OPERAND INSTRUCTIONS

BACKGROUND OF THE INVENTION

1. Field of the Invention

The present invention relates to a data processor which realizes a high processing ability by means of a sophisticated pipeline processing mechanism.

2. Description of Prior Art

Description is made on how to process an instruction performing a transfer from a register to a register, for example, by means of two kinds of instructions having different instruction formats in the data processor comprising the conventional pipeline mechanism.

FIG. 1 shows an example of a pipeline mechanism of a conventional data processor.

In FIG. 1, numeral 71 designates an instruction fetch (IF) stage, numeral 72 designates an instruction decoding (D) stage, numeral 73 designates an operand address calculation (A) stage, numeral 74 designates an operand fetch (F) stage and numeral 75 designates an instruction execution (E) stage.

The IF stage 71 fetches an instruction code from a memory (not shown) and outputs it to the D stage 72. The D stage 72 decodes the instruction code inputted from the IF stage 71 and outputs the decoding result to the A stage 73. The A stage 73 calculates an execute address of an operand specified in the instruction code and outputs the calculated operand address to the F stage 74. The F stage 74 fetches an operand from the memory according to the operand address inputted from the A stage 73 and accesses a micro-instruction from a micro-ROM (not shown) based on the decoding result, decodes this micro-instruction and outputs the decoding result to the E stage 75. The F stage 74 also outputs the fetched operand to the E stage 75. The E stage 75 executes an operation specified in the instruction code for the operand inputted from the F stage 74. Furthermore, it stores the operation result in a memory (not shown) as required.

Description is made on the case of processing, for example, two kinds of instructions whose instruction formats are shown in FIG. 2 and FIG. 3 respectively, that is, an A format instruction and a B format instruction by the conventional data processor as described above.

The A format instruction is an instruction between a memory and a register, and in the instruction code of this instruction, the memory designating field to become a destination and the register designating field to become a source are aligned in this sequence as shown in FIG. 2. On the other hand, the B format instruction is also an instruction between a memory and a register, but unlike the above-mentioned A format instruction, the memory designating field to become a source and the register designating field to become a destination are aligned in this sequence as shown in FIG. 3.

Hereinafter, description is made on the above-described two kinds of instructions, that is, the A format instruction and the B format instructions, for example, an instruction performing a transfer directly from a register to a register "MOV:A R1 R2" and "MOV:B R1 R2". Note that R1 and R2 specify a register 1 and a register 2 respectively.

This is the case of the instruction between a register and a memory wherein the memory becomes the register particularly. "MOV:A" means a transfer instruction of the A format and "MOV:B" means a transfer instruction of the B format respectively, and R1 specifies the register 1, and R2 specifies the register 2 respectively, and this assembly code means "MOV:? source destination" (here ? specifies A or B). The instruction "MOV:A R1 R2" becomes a code "0001 0010 00 " in the instruction code and the instruction "MOV:B R1 R2" becomes a code "0010 0001 01 " in the instruction code. Here, "0001" means the register 1, "0010" means the register 2, and the third field of two bits shows the A format or the B format, and the last field "**" specifies a MOV operation.

The above-described two kinds of instructions, the instruction "MOV:A R1 R2" and the "MOV:B R1 R2" are decoded independently, and in the F stage 74, according to the respective decoding results, the respective different microprograms are accessed and instructions are executed.

In the data processor having the conventional pipeline mechanism, in processing two kinds of instructions having different instruction formats, for example, the instruction "MOV:A R1 R2" and the instruction "MOV:B R1 R2", these instructions are decoded independently by a decoder and different decoding result are obtained. For this reason, different micro-programs are required to realize the substantially same function.

SUMMARY OF THE INVENTION

The present invention purposes to avoid the waste of the conventional pipeline mechanism in the data processor as described above, and thereby provide a highly efficient data processor.

In the data processor of the present invention, to solve the above-described deficiency, a configuration is adopted wherein the instruction decoder is constituted with two stages, a first stage and a second stage, and for example, where the instruction "MOV:A R1 R2" and the instruction "MOV:B R1 R2" are processed, the A format instruction (or the B format instruction) is decoded intact by the second decoder, and the B format instruction (or the A format instruction) exchanges the register number designating fields thereof with each other.

In the data processor of the present invention, for example, the instruction "MOV:A R1 R2" is processed by the steps of the first decoding, the second decoding and micro-ROM access, while the instruction "MOV:B R1 R2" is processed by the steps of the first decoding, the second decoding, exchanging of the register number designating fields simultaneous with each other and micro-ROM access. For these two kinds of instructions, exchanging of the register number designating fields is performed for an instruction having one of the format by the second decoder, and thereby the two kinds of instructions become the same instruction, being processed by one micro-program.

The above and further objects and features of the invention will more fully be apparent form the following detailed description with accompanying drawings.

BRIEF DESCRIPTION OF THE DRAWINGS

FIG. 19 is a schematic diagram showing a format wherein an addressing mode designating part is of a PC relative indirect mode, FIG. 20 is a schematic diagram showing a format wherein an addressing mode designating part is of a stack POP mode, FIG. 21 is a schematic diagram showing a format wherein an addressing mode designating part is of a stack PUSH mode, FIG. 22 is a schematic diagram showing a format of a register base chained addressing mode.

DESCRIPTION OF THE PREFERRED EMBODIMENTS

Hereinafter, detailed description is made on the present invention based on drawings showing one embodiment thereof.

(1)"Instruction Format of Data Processor of the Present Invention"

An instruction of a data processor of the present invention is formed on a 16-bit unit basis, being variable in length, and no instruction of odd bytes is used herein.

The data processor of the present invention has instruction formats specifically devised for the purpose of executing a highly frequent instruction in a short format at high speed. For example, as to a two-operand instruction, two formats are provided; a general-type format which has basically a configuration of "four bytes + extension part (s)" and allows the utilization of all addressing modes and a reduced-type format allowing only the use of a highly frequent instruction and an addressing mode.

The meanings of symbols expressing in the instruction format of the data processor of the present invention are as follows:

—: Portion wherein operation code is put.

: Portion wherein literal or immediate value is put.

Ea: Portion for generating an operand in a general-type 8-bit addressing mode.

Sh: Portion for designating an operand in a reduced-type 6-bit addressing mode.

Rn: Portion for designating an operand in a register by the register number.

Figure 1:
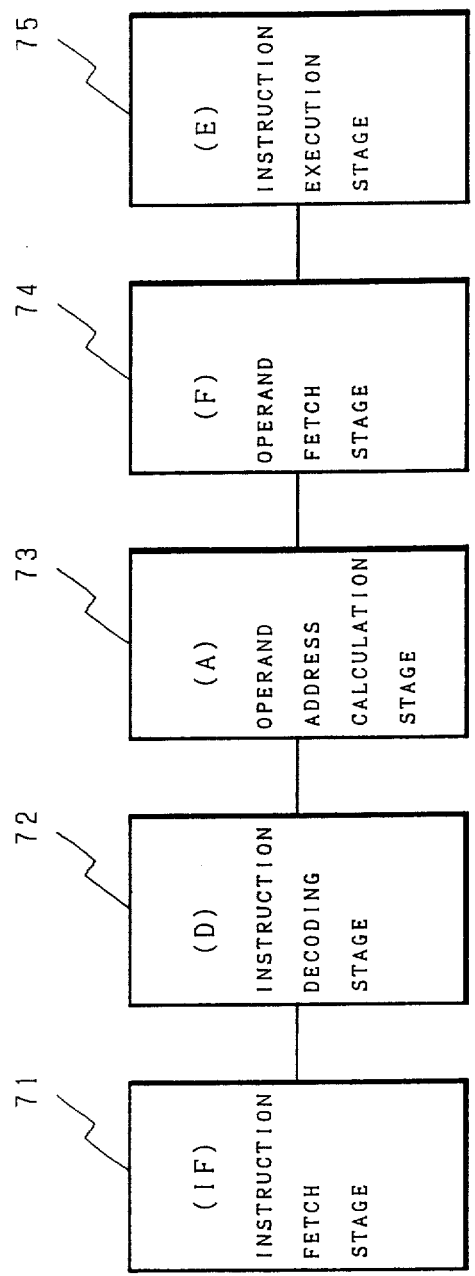
FIG. 1 is a block diagram showing a configuration of a pipeline processing mechanism in a conventional data processor.
Figure 2:
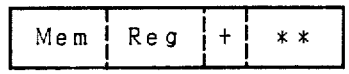
FIG. 2 and FIG. 3 are schematic diagrams showing a format of a conventional data processor.
Figure 3:
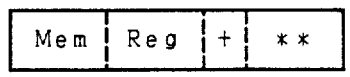
Figure 4:
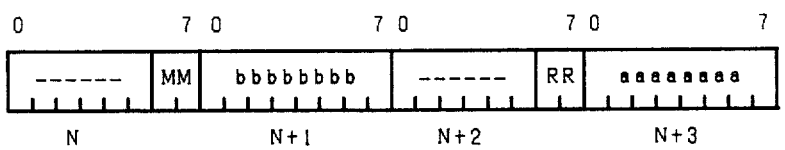
FIG. 4 is a schematic diagram showing a typical form of an instruction format of a data processor in accordance with the present invention.

In the format, as shown in FIG. 4, the right side is the LSB side and is high address. The instruction format can be discriminated only after an address N and an address N+1 are checked, and as described above, this is because of a premise that the instruction is fetched and decoded on a 16-bit (2-byte) unit basis without fail.

In the data processor of the present invention, in the case with any format, the extension part of Ea or Sh of each operand is sure to be positioned immediately after a half word comprising the basic part of that Ea or Sh. This takes precedence over the immediate value data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next instruction. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first word of instruction (including the basic part of Ea1), the expansion part of Ea1, the chained addressing mode extension part, the second half word of instruction (including the basic part of Ea2), the expansion part of Ea1 and the third half word of instruction.

(1.1)"Reduced-Type Two-Operand Instruction"

FIG. 5 through FIG. 8 are schematic diagrams showing reduced-type formats of the two-operand instruction.

Figure 5:
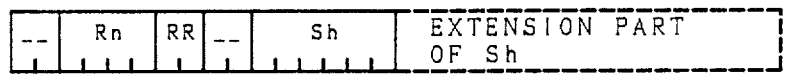
FIG. 5 is a schematic diagram showing a reduced-type format of an operational instruction between memory and register.

FIG. 5 is a schematic diagram showing a format of an operational instruction between memory and register. This format includes a L-format wherein the source operand side is a memory and a S-format wherein the destination operand side is a memory.

In the L-format, Sh represents the designating field of the source operand, Rn represents the designating field of the register of the destination operand and RR represents designating of the operand size of Sh, respectively. The size of the destination operand taken into the register is fixed to 32 bits. Where the size of the resister side differs from that of the memory side and the size of the source side is smaller, sign extension is performed.

In the S-format, Sh represents the designating field of the destination operand, Rn represents the register designating field of the source operand and RR represents designating of the operand size of Sh, respectively. The size of the source operand taken into the register is fixed to 32 bits. Where the size of the register side differs from that of the memory side and the size of the source side is larger, truncating of the overflow portion and overflow check are performed.

Figure 6:
FIG. 6 is a schematic diagram showing a reduced-type format of an operational instruction between register and register.

FIG. 6 is a schematic diagram showing a format of an operational instruction between register and register (R-format). A symbol Rn represents the designating field of the destination register, and Rm represents the designating field of the source register. The operand size is 32 bits only.

Figure 7:
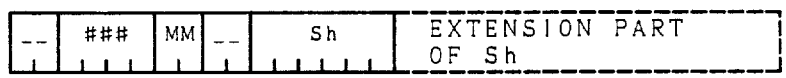
FIG. 7 is a schematic diagram showing a reduced-type format of an operational instruction between literal and memory.

FIG. 7 is a schematic diagram showing a format of an operational instruction between literal and memory (Q-format). A symbol MM shows the designating field of the destination operand size, ### shows the designating field of the source operand by literal, and Sh shows the designating field of the destination operand.

Figure 8:
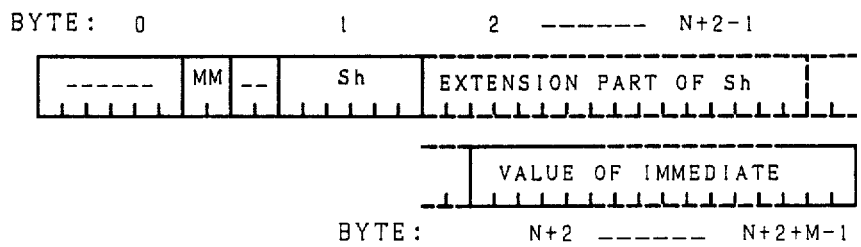
FIG. 8 is a schematic diagram showing a reduced-type format of an operational instruction between immediate value and memory.

FIG. 8 is a schematic diagram showing a format of an operational instruction between immediate value and memory (I-format). A symbol MM represents the designating field of the operand size (common in source and destination), and Sh represents the designating field of the destination operand. The sizes of the immediate value of the I-format are 8, 16 and 32 bits in common with the sizes of the operand of the destination side, and zero extension and sign extension are not performed.

(1.2)"General-Type One-Operand Instruction"

Figure 9:
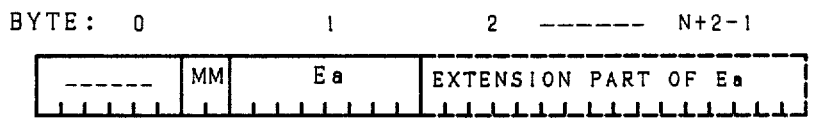
FIG. 9 is a schematic diagram showing a general-type format of a one-operand instruction.

FIG. 9 is a schematic diagram showing a general-type format of one-operand instruction (G1-format). The symbol MM represents the designating field of the operand size. Some of the G1-format instructions comprise an extension part besides the extension part of Ea. There are also instructions using no MM.

(1.3)"General-Type Two-Operand Instruction"

Figure 10:
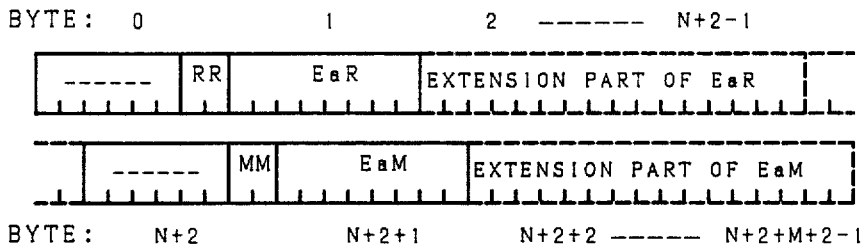
FIG. 10 is a schematic diagram showing a general-type format of a two-operand instruction wherein a first operand instruction necessitates memory read-out.
Figure 11:
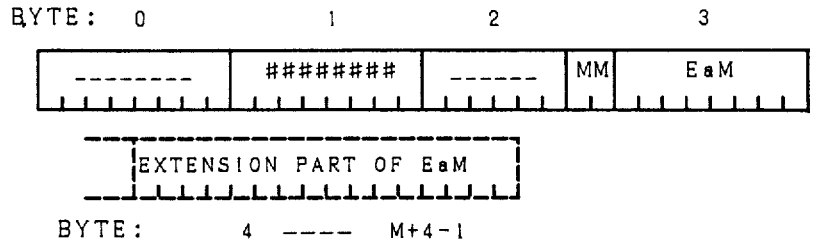
FIG. 11 is a schematic diagram showing a general-type format of a two-operand instruction wherein a first operand is an eight-bit immediate value.
Figure 12:
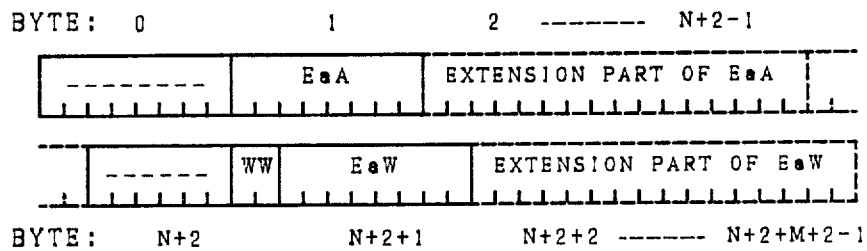
FIG. 12 is a schematic diagram showing a general-type format of a two-operand instruction wherein a first operand is only address calculation.

FIG. 10 through 12 are schematic diagrams showing general-type formats of two-operand instruction. This format comprises an instruction having a maximum of two operands of the general-type addressing mode which are designated by eight bits. There are cases where the total number itself of operands becomes three or more.

FIG. 10 is a schematic diagram showing a format of an instruction wherein a first operand necessitates memory read-out (G-format). A symbol EaM represents the designating field of the destination operand, MM represents the designating field of the destination operand size, EaR represents the designating field of the source operand, and RR represents the designating field of the source operand size.

FIG. 11 is a schematic diagram showing a format of an instruction wherein a first operand is an instruction of eight-bit immediate value (E-format). EaM represents the designating field of the destination operand, MM represents the designating field of the destination operand size, and ##... represents the source operand value.

The E-format and the I-format have similar functions, but their conceptions greatly differ from each other. Specifically, the E-format is coherently of a type derived from the general type of two-operand (G-format), the size of source operand is eight-bit fixed, and the size of destination operand is selected from among 8, 16 and 32 bits. This means that the E-format presupposes operation between different sizes, and the source operand of eight bits is zero-extended or sign-extended in a manner of agreeing with the size of the destination operand. On the other hand, the I-format is of a type that the patterns of immediate value having high frequency particularly in the transfer instruction and the comparison instruction are shortened, and the sizes of the source operand and the destination operand are equal.

FIG. 12 is a schematic diagram showing a format of an instruction wherein a first operand is only address calculation. A symbol EaW represents the designating field of the destination operand, WW represents the designating field of the destination operand size, and EaA represents the designating field of the source operand. For the source operand, the calculation result itself of effective address is used.

Figure 13:
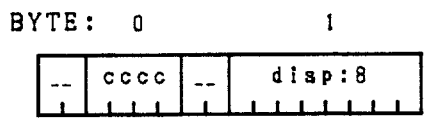
FIG. 13 is a schematic diagram showing an instruction format of short branch.

FIG. 13 is a schematic diagram showing a format of a short branch instruction. Symbol cccc represents the designating field of branch condition, disp:8 represents the designating field of displacement to a jump destination, and in the data processor of the present invention, when displacement is designated by eight bits, the displacement value is set by doubling the designated value in the bit pattern.

(1.4)"Addressing Mode"

The methods of designating the addressing mode of the data processor of the present invention include the reduced type designated by six bits including the register and the general type designating by eight bits.

Where an undefined addressing mode has been designated, or where a combination of addressing modes obviously unsuitable has been designated, a reserved instruction exception is generated likewise the case where the undefined instruction has been executed, and exception processing is started.

Equivalents to the above include the case where the destination is the immediate value mode and the case where the immediate value mode is used in the designating field of the addressing mode to be accompanied by address calculation.

Meanings of symbols used in the format diagram is as follows:

Rn: Register designating mem [EA]: Memory content of address as shown by EA (Sh): Designating method by the reduced-type addressing mode of six bits (Ea): Designating method by the general-type addressing mode of eight bits In the format diagram, the portion surrounded by a broken line shows the extension part.

(1.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate value mode, an absolute mode, a Program Counter (PC) relative indirect mode, a stack pop mode and a stack push mode.

Figure 14:
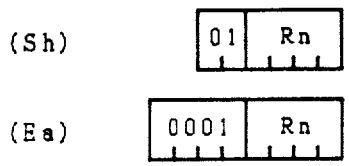
FIG. 14 is a schematic diagram showing a format wherein an addressing mode designating part is of a register direct mode.

The register direct mode takes the content of register intact as an operand. FIG. 14 is a schematic diagram of the format thereof. Symbol Rn shows the number of the general-purpose register.

Figure 15:
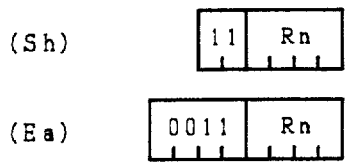
FIG. 15 is a schematic diagram showing a format wherein an addressing mode designating part is of a register indirect mode.

The register indirect mode takes the content of the memory whose address is the content of register as an operand. FIG. 15 is a schematic diagram of the format thereof. Symbol Rn shows the number of the general-purpose register.

Figure 16:
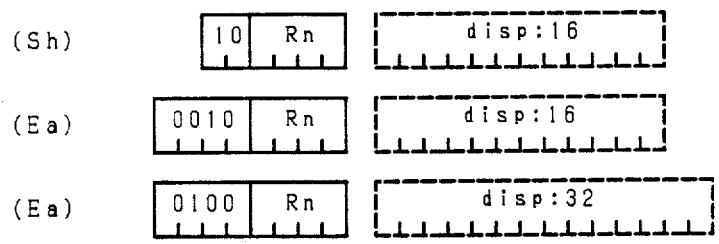
FIG. 16 is a schematic diagram showing a format wherein and addressing mode designating part is of a register relative indirect mode.

The register relative indirect mode includes two kinds of 16 bits and 32 bits of the displacement value. Each of them takes the content of the memory whose address is the value of the content of the register added to the displacement value of 16 bits or 32 bits as an operand. FIG. 16 is a schematic diagram of the format thereof. Symbol Rn shows the number of the general-purpose register. Symbols disp:16 and disp:32 show the displacement value of 16 bits and the displacement value of 32 bits, respectively. The displacement value is treated with a sign affixed.

Figure 17:
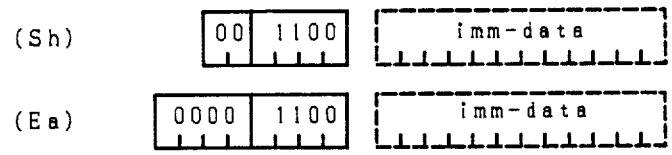
FIG. 17 is a schematic diagram showing a format wherein and addressing mode designating part is of an immediate value mode.

The immediate mode takes the bit pattern designated in the instruction code as an operand while assuming it intact as a binary number. FIG. 17 is a schematic diagram of the format thereof. Symbol imm_data shows the immediate value. The size of imm_data is designated in the instruction as the operand size.

Figure 18:
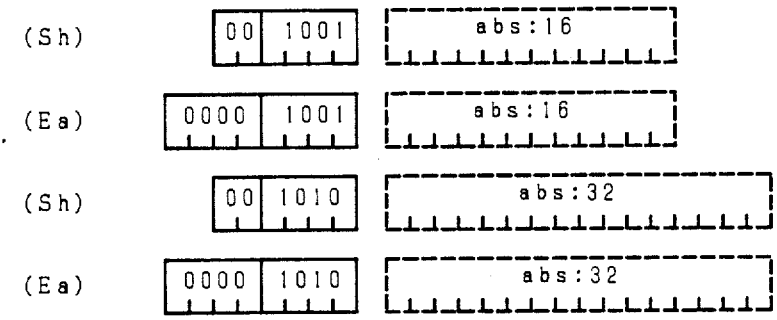
FIG. 18 is a schematic diagram showing a format wherein an addressing mode designating part is of an absolute mode.

The absolute mode includes two kinds of 16 bits and 32 bits for showing the address value. Each kind takes the content of the memory whose address is the bit pattern of 16 bits or 32 bits designated in the instruction code as an operand. FIG. 18 is a schematic diagram showing the format thereof. Symbols abs:16 and abs:32 show the address values of 16 bits and 32 bits, respectively. When the address is shown by abs:16, the designated address value is sign-extended to 32 bits.

The PC relative indirect mode includes two kinds of 16 bits and 32 bits of the displacement value. Each takes the content of the memory whose address is the value of the content of a program counter whereto the displacement value of 16 bits or 32 bits is added as an operand. FIG. 19 is a schematic diagram showing the format thereof. Symbols disp:16 and disp:32 show the displacement value of 16 bits and the displacement value of 32 bits, respectively. The displacement value is treated with a sign affixed. In the PC relative indirect mode, the value of the program counter to be referred is the head address of the instruction comprising the operand. Where the value of the program counter is referred in the chained addressing mode, the head address of the instruction is also used as a reference value of PC relativity.

The stack pop mode takes the content of the memory whose address is the content of a stack pointer (SP) as an operand. After operand access, the SP is incremented by the operand size. For example, where 32-bit data is handled, the SP is renewed (incremented) by +4 after the operand access. Designating of the stack pop mode for operands of sizes of B and H can also be performed, and the SP is renewed (incremented) by +1 and +2, respectively. FIG. 20 is a schematic diagram of the format thereof. As to the one wherein the stack pop mode is invalid for the operand, a reserved instruction exception is generated. Specifically, the stack pop mode designating for a write operand and a read-modify-write operand becomes the reserved instruction exception.

The stack push mode takes the content of the memory whose address is the content of the SP decremented by the operand size as an operand. In the stack push mode, the SP is decremented before operand access. For example, when handling 32-bit data, the SP is renewed (decremented) by −4 before operand access. It is also possible to designate the stack push mode for operands of sizes of B and H, and the stack pointer SP is renewed (decremented) by −1 and −2, respectively. FIG. 21 is a schematic diagram showing the format thereof. As to the one wherein the stack push mode is invalid for the operand, a reserved instruction exception is generated. Specifically, the stack push mode designated for a read operand and a read-modify-write operand becomes the reserved instruction exception.

(1.4.2) "Chained Addressing Mode"

Addressing, whatever complicated, can basically be decomposed into combinations of addition and indirect reference. Accordingly, operations of addition and indirect reference are given in advance as primitives of addressing, and if they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When designating the chained addressing mode, in the basic addressing mode designated field, one from among three kinds of designating methods of a register base chained addressing mode, a PC base chained addressing mode and an absolute chained addressing mode is designated.

The register base chained addressing mode is an addressing mode taking the value of register as the base value of the chained addressing to be extended. FIG. 22 is a schematic diagram showing the format thereof. Symbol Rn shows the number of the general-purpose register.

Figure 23:
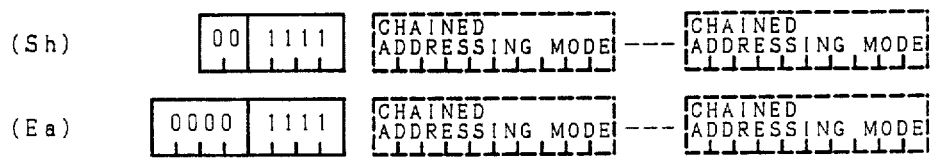
FIG. 23 is a schematic diagram showing a format of a PC base chained addressing mode.

The PC base chained mode is an addressing mode taking the value of the program counter (PC) as the base value of the chained addressing to be extended. FIG. 23 is a schematic diagram showing the format thereof.

Figure 24:
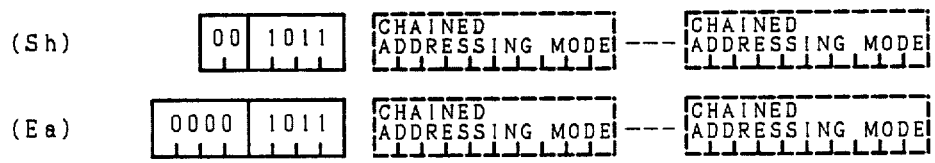
FIG. 24 is a schematic diagram showing a format of an absolute base chained addressing mode.

The absolute base chained addressing mode is an addressing mode taking zero as the base value of the chained addressing to be extended. FIG. 24 is a schematic diagram of the format thereof.

Figure 25:
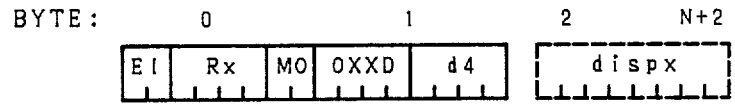
FIG. 25 is a schematic diagram showing designating fields for addition of displacement value, scaling and addition of index value, and indirect reference of memory in a format of one stage in a chained addressing mode.

The chained addressing mode designating field to be extended takes 16 bits as a unit, and this is repeated arbitrary times. By the chained addressing mode of one stage, addition of displacement, scaling (×1, ×2, ×4, ×8) and addition of an index register, and indirect reference of a memory are performed. FIG. 25 is a schematic diagram showing the format of the chained addressing mode. Each field has meanings as shown below.

E=0: Continuation of the chained addressing mode is continued.

E=1: Address calculation ends.
tmp==>address of operand

I=0: No memory indirect reference is performed.
tmp+disp+Rx*Scale==>tmp

I=1: Memory indirect reference is performed. mem [tmp+disp+Rx*Scale]==>tmp

M=0: <Rx> is used as an index.

M=1: Special index

<Rx> = 0 Index value is not added.

(Rx = 0)

<Rx> = 1 Program counter is used as an index value.

(Rx = PC)

<Rx> = 2~ Reserved.

D=0: The value of field d4 of four bits in the chained addressing mode is quadrupled to be taken as a displacement value, and this value is added. The d4 is treated with a sign affixed, and is used by surely quadrupling it irrespective of the size of the operand.

D=1: The dispx (16/32 bits) designated in the extension part of the chained addressing mode is taken as a displacement value, the size of the extension part whereto this value is added is designated in the d4 field.

d4 = 0001   dispx: 16 bits d4 = 0010   dispx: 32 bits

XX: Index scale (scale =1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 26:
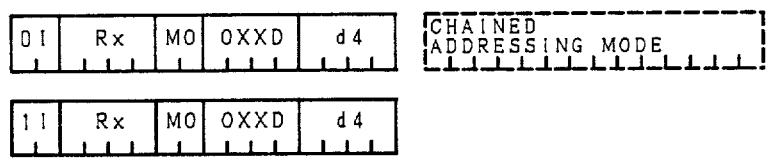
FIG. 26 is a schematic diagram showing a variation of whether or not the chained addressing mode is to be continued.
Figure 27:
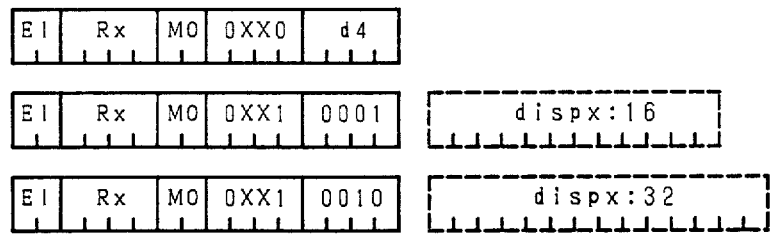
FIG. 27 is a schematic diagram showing a variation of size of displacement value.

FIG. 26 and FIG. 27 show variations on the instruction format formed by the chained addressing mode.

FIG. 26 shows variations of continuation and completion of the chained addressing mode.

FIG. 27 shows variations on the size of displacement.

If the chained addressing mode of an arbitrary number of stages can be utilized, the case-sorting on a number of stages basis in the compiler can be dispensed with, and therefore an advantage of alleviating the burden on the compiler is obtainable. This is because, even if frequency of chained reference is very low, the compiler has to be able to generate a correct code without fail. For this reason, an arbitrary number of stages can be applied in the format.

(1.5)"Exceptional Processing"

The data processor of the present invention has abundant exceptional processing functions for alleviating software load. In the data processor of this invention, there are three kinds of the exceptional processing, which are re-execution of instruction processing (named exception), completion of instruction processing (named trap) and interruption. In the data processor of the present invention, these three kinds of exceptional processings and system faults are generally called EIT.

(2)"Configuration of Function Block"

Figure 28:
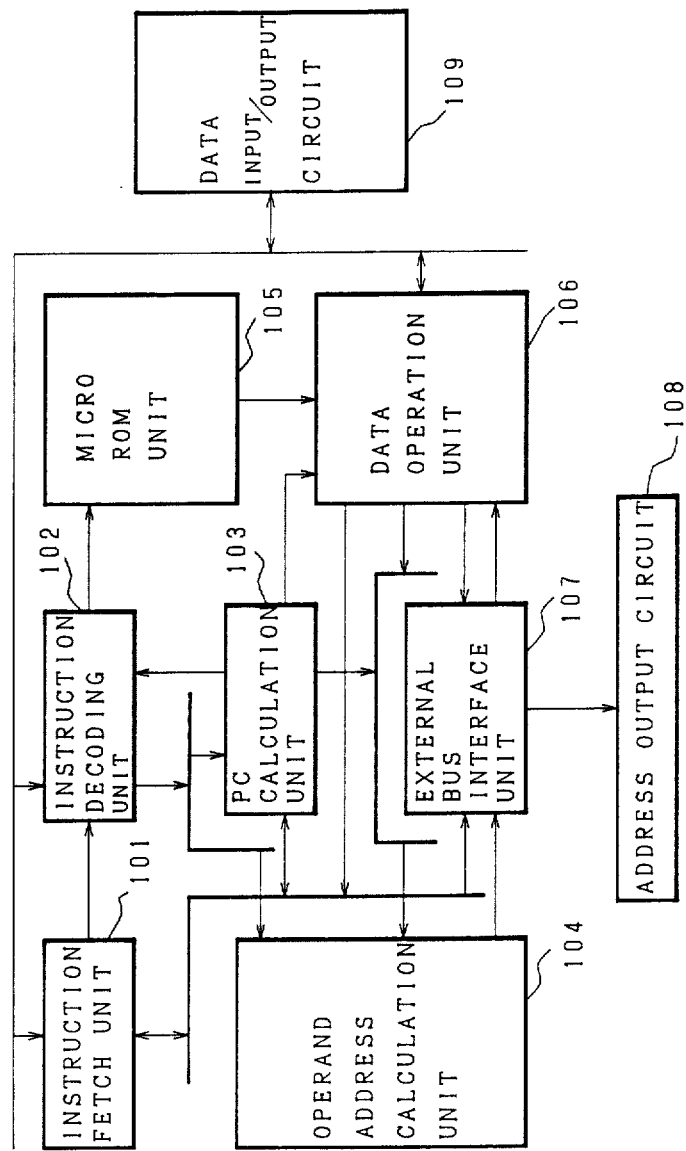
FIG. 28 is a block diagram showing a configuration of the data processor of the present invention.

FIG. 28 is a block diagram showing a configuration of the data processor of the present invention.

The interior of the data processor of the present invention is functionally divided roughly into an instruction fetch unit 101, an instruction decoding unit 102, a PC calculation unit 101, an operand address calculation unit 104, a micro ROM unit 105, a data operation unit 106 and an external bus interface unit 107.

In FIG. 28, in addition to the above-described units, an address output circuit 108 for outputting address to the exterior of a CPU and a data input/output circuit 109 for inputting and outputting data from and to the exterior of the CPU are shown being separated from the other function block units.

(2.1)"Instruction Fetch Unit"

The instruction fetch unit 101 which comprises a branch buffer, an instruction queue 85 and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988).

The address of an instruction to be fetched next is calculated by a dedicated counter as the address of the instruction to be inputted to an instruction queue 85. In the case where a branch or jump is generated, an address of a new instruction is transferred from the PC calculation unit 103 or the data operation unit 106.

In the case where an instruction is fetched from a memory outside the CPU, the address of the instruction to be fetched is outputted from the address output circuit 108 to the outside of the CPU through the external bus interface unit 107, and an instruction code is fetched from the data input/output circuit 109. Then, among the instruction codes in buffering, the instruction code to be decoded next is outputted to the instruction decoding unit 102.

(2.2)"Instruction Decoding Unit"

In the instruction decoding unit 102, basically an instruction code is decoded on a 16-bit (half word) basis. This block comprises a FHW decoder for decoding an operation code included in the first half word, a NFHW decoder for decoding an operation code including in the second and the third half words, and an addressing mode decoder for decoding an addressing mode. These FHW decoder, NFHW decoder and addressing mode decoder are generally called a first decoder 86.

There are also a second decoder 87 which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 102 decodes the instruction code being inputted from the instruction fetch unit 101 by 0–6 bytes per two clocks (one step). Among the results of decoding, information on operation in the data operation unit 106 is outputted to the micro ROM unit 105, information on operand address calculation is outputted to the operand address calculation unit 104, and information on PC calculation is outputted to the PC calculation unit 103, respectively.

(2.3) "Micro ROM Unit"

The micro ROM unit 105 comprises a micro ROM for storing microprograms which mainly control the data operation unit 106, a micro sequencer, and a micro instruction decoder. A micro instruction is read out from the micro ROM once per two clocks (one step). The micro sequencer accepts processings of exception, interruption and trap (these three are generally called EIT) in a hardware manner in addition to the sequential processings shown by the microprograms. The micro ROM unit 105 also controls a store buffer. To the micro ROM unit 105, there are inputted flag information generated by interruption independent of the instruction code or by the result of operation execution, and output of an instruction decoding unit such as output of a second decoder 87. Output of the micro decoder is mainly performed to the data operation unit 106, but some information such as information of stopping other preceding processing due to execution of a jump instruction is outputted also to other blocks.

(2.4) "Operand Adress Calculation Unit"

The operand address calculation unit 104 is controlled in a hardwired method by information on operand address calculation outputted from the address decoder of the instruction decoding unit 102 or the like. In this block, substantially all of processings on operand address calculation are performed. Checking is made for whether or not the address of memory access for memory indirect addressing and the operand address can be entered in an I/O area mapped in the memory.

The result of address calculation is sent to the external bus interface unit 107. The values of the general-purpose register and the program counter required for address calculation are inputted from the data operation unit.

In performing the memory indirect addressing, the memory address to be referred is outputted from the address output circuit 108 to the outside of the CPU through the external bus interface unit 107, and the indirect address value inputted from the data input/output unit 109 is fetched through the instruction decoding unit 102.

(2.5) "PC Calculation Unit"

The PC calculation unit 103 is controlled in a hardwired manner by information on PC calculation outputted from the instruction decoding unit 102, and calculates the PC value of an instruction. The data processor of the present invention has a variable-length instruction set, and the length of that instruction can be found only after the instruction is decoded. For this reason, the PC calculation unit 103 generates the PC value of the next instruction by adding the length of the instruction outputted from the instruction decoding unit 102 to the PC value of the instruction in decoding. In the case where the instruction decoding unit 102 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

On this pre-branch approach, detailed description is disclosed in the Japanese Patent Application Laid-Open No. 63-59630 (1988) and the Japanese Patent Application Laid-Open No. 63-55639 (1988).

The result of calculation in the PC calculation unit 103 is outputted as the PC value of each instruction together with the result of decoding of the instruction, and in addition, is outputted to the instruction fetch unit 101 as the address of the instruction to be decoded next at prebranch. Also, it is used for the address for branch prediction of the instruction to be decoded next in the instruction decoding unit 102.

On the branch predicting approach, detailed description is disclosed in the Japanese Patent Application Laid-Open No. 63-175934 (1988).

(2.6) "Data Operation Unit"

The data operation unit 106 is controlled by microprograms, and executes the operation required for realizing the function of each instruction by means of registers and an arithmetic unit according to output information of the micro ROM unit 105. There are two cases that the address calculated in the operand address calculation unit 104 is obtained by passing it through the external bus interface unit 107 and that the case which is fetched by the address calculated by the operand address calculation unit 104 is obtained through the data input/output circuit 109.

Arithmetic units include an ALU, a barrel shifter, a priority encoder, a counter, and a shift register. The registers and the main arithmetic units are connected through three buses, and one micro instruction for directing operation between registers is processed in two clocks (one step).

In the case where an access to the memory outside the CPU is required at the data operation, the address is outputted from the address output circuit 108 to the outside of the CPU through the external bus interface unit 107 by the direction of the microprogram, and the aimed data is fetched through the data input/output circuit 109.

In the case where data is stored in the memory outside the CPU, the address is outputted from the address output circuit 108 through the external bus interface unit 107, and simultaneously the data is outputted from the data input/output circuit 109 to the outside of the CPU. In order to efficiently perform operand store, a four-byte store buffer is installed in the data operation unit 106.

In the case where the data operation unit 106 obtains a new instruction address by processing a jump instruction or an exceptional processing, this is outputted to the instruction fetch unit 101 and the PC calculation unit 103.

(2.7) "External Bus Interface Unit"

The external bus interface unit 107 controls communication through the external bus of the data processor of the present invention. All accesses to memories are performed in a clock-synchronized method, and can be performed in a minimum of two clock cycles (one step).

Access requests to memories are generated independently from the instruction fetch unit 101, the operand address calculation unit 104 and the data operation unit 106. The external bus interface unit 107 method these memory access requests. Furthermore, the access to the data located at the memory address striding over the arrangement boundary of 32 bits (one word) which is the size of the data bus connecting the memory to the CPU is performed in a manner that striding over the word boundary is automatically detected in this block and the access is decomposed into memory accesses of two times.

This unit also performs conflict preventing processing and by-pass processing from the store operand to the fetch operand in the case where the operand to be pre-fetched and the operand to be stored are superposed.

(3) "Pipeline Processing Mechanism"

Figure 29:
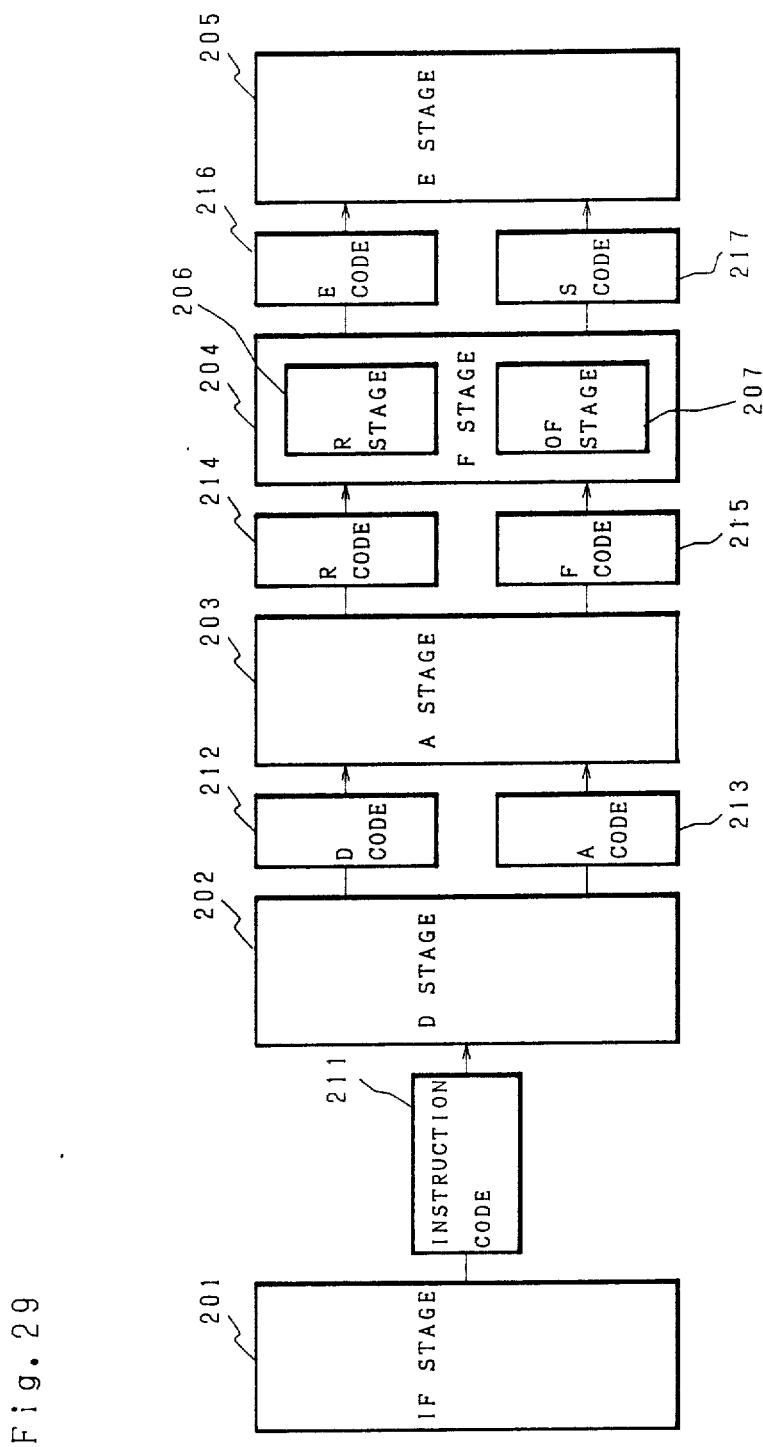
FIG. 29 is a block diagram showing a configuration of a pipeline function of the data processor of the present invention.

FIG. 29 is a schematic diagram showing a pipeline processing mechanism of the data processor of the present invention.

The basis of pipeline processing has a five-stage configuration which comprises an instruction fetch stage (IF stage) 201 for prefetching an instruction, a decoding stage (D stage) 202 for decoding the instruction, an operand address calculation stage (A stage) 203 for performing address calculation of an operand, an operand fetch stage (F stage) 204 consisting of a portion for performing micro ROM access (particularly called a R stage 206) and a portion for prefetch an operand (particularly called on OF stage 207), and an execution stage (E stage) 205 for executing an instruction.

The E stage 205 comprises a one-stage buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instruction having a plurality of memory operands, the pipeline processing is performed based on the number of memory operands by decomposing it into a plurality of pipeline processing units (step code) at the decoding stage.

On the decomposing method of the pipeline processing unit, detailed description is disclosed in the Japanese Patent Application Laid-Open No. 63-89932 (1988).

Information transferred from the IF stage 201 to the D stage 202 is an instruction code 211 itself. Information transferred from the D stage 202 to the A stage 203 includes two kinds of information, one on operation designated by an instruction (called a D code 212) and the other on address calculation of operand (called an A code 213).

Information transferred from the A stage 203 to the F stage 204 includes an R code 214 comprising an entry address of a microprogram or a parameter of the microprogram and an F code 215 comprising an operand address and information on directing the method of access.

Information transferred from the F stage 204 to the E stage 205 is an E code 216 comprising operation control information and literal and an S code 217 comprising an operand or an operand address.

EIT detected in the stage other than the E stage 205 does not start the EIT processing until the code thereof reaches the E stage 205. This is because only the instruction processed in the E stage 205 is an instruction at the step of execution, and the instructions having been processed between the IF stage 201 and the F stage 204 do not reach the step of execution yet. Accordingly, for the EIT detected in the stage other than the E stage 205, the detection thereof is recorded in the step code, and it is only transmitted to the following stage.

(3.1) "Pipeline Processing Unit"
(3.1.1) "Classification of Instruction Code Fields"

The pipeline processing unit of the data processor of the present invention is determined by utilizing the feature of the format of an instruction set.

As described in Section (1), the instruction of the data processor of the present invention is a variable-length instruction of two-byte unit, and basically the instruction is configurated by repeating one to three times "a two-byte instruction base part + an addressing extension part of 0 to 4 bytes".

In many cases, the instruction base part comprises an operation code part and an addressing mode designating part, and in the case where index addressing or memory indirect addressing is required, "a two-byte chained addressing mode designating part + an addressing extension part of 0 to 4 bytes" is affixed by an arbitrary number in place of the addressing extension part. The extension part of two or four bytes which is peculiar to the instruction is also affixed lastly depending on the instruction.

The instruction base part comprises an operation code of an instruction, a basic addressing mode, literal and the like. The addressing extension part is any one of displacement, as absolute address, an immediate value and displacement of branch instruction. The extension part peculiar to the instruction comprises a register map, an immediate value designating of the I-format instruction and the like.

Figure 30:
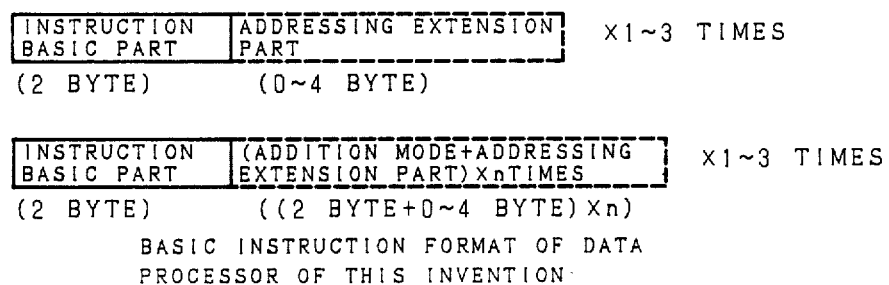
FIG. 30 is a schematic diagram showing a basic instruction format of the data processor of the present invention.

FIG. 30 is a schematic diagram showing the feature of the basic instruction format of the data processor of the present invention.

(3.1.2) "Decomposition of Instruction into Step Codes"

The data processor of the present invention performs the pipeline processing making the most of the feature of the above-mentioned instruction format.

In the D stage 202, "a two-byte instruction base part + an addressing extension part of 0 to 4 bytes", "a chained addressing mode designating part + an addressing extension part", or an extension part peculiar to the instruction is processed as one decoding unit. The result of decoding of each time is called a step code, and in and after the A stage 203, this step code is taken as a unit of pipeline processing. The number of step codes is peculiar to each instruction, and in the case where the chained addressing mode designating is not performed, one instruction is divided into a minimum of one step code to a maximum of three step codes. In the case where the chained addressing mode designating is performed, the number of step codes is increased by a number as required. Note that this is performed only in the decoding step as described later.

(3.1.3)"Control of Program Counter"

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC). The SPC is transferred sequentially from one pipeline stage to the other.

(3.2)"Processing of Each Pipeline Stage"

As shown in FIG. 29. for convenience sake, names are given to the input and output step codes of each pipeline stage. The step codes perform processing relating to the operation codes, and include two series; a series becoming entry addresses of microprograms and parameters for the E stage 205 and a series becoming operands for microinstructions of the E stage 205.

(3.2.1)"Instruction Fetch Stage"

The instruction fetch stage (IF stage) 201 fetches an instruction from the memory of the branch buffer and input it to the instruction queue 85, and outputs an instruction code to the D stage 202. Input of the instruction queue 85 is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue 85 is variable on a two-byte basis, and a maximum of six bytes can be outputted during two clocks. Immediately after a branch, two bytes of the instruction base part can also be transferred directly to the instruction decoder by by-passing the instruction queue 85.

Control of registering, clearing and the like of the instruction to the branch buffer, management of addresses of the instructions to be prefetched and control of the instruction queue 85 are also performed in the IF stage 201.

The EITs detected in the IF stage 201 include a bus access exception in fetching an instruction from the memory or an address conversion exception due to memory protection violation.

(3.2.2)"Instruction Decoding Stage"

The instruction decoding stage (D stage) 202 decodes an instruction code inputted from the IF stage 201. Decoding is performed by two clock (one step) basis using the first decoder 86 consisting of the FHW decoder, the NFHW decoder and the addressing mode decoder in the instruction decoding unit 102, and an instruction code of 0 to 6 bytes is consumed in the decoding processing of one-time (no instruction code is consumed in the outputting processing of the step code comprising the return address of the RET instruction). By one-time decoding, the control code which is the A code 213 as address calculation information, address modification information, the control code which is the D code 212 as the result of intermediate decoding of the operation code, and eight-bit literal information are inputted to the A stage 203.

In the stage 202, control of the PC calculation unit 103 of each instruction, branch prediction processing, prebranch processing for the pre-branch instruction and outputting processing of the instruction code from the instruction queue 85 are also performed.

The EITs detected in the D stage 202 include a reserved instruction exception and an odd address jump trap at prebranch. Various EITs transferred from the IF stage 201 are also transferred to the A stage 203 through processing of encoding into the step code.

(3.2.3)"Operand Address Calculation Stage"

Processing functions of the operand address calculation stage (A stage) are roughly divided into two parts. One is processing for post-decoding of the operation code using the second decoder 87 of the instruction decoding unit 102 and the other is for calculation of operand address in the operand address calculation unit 104.

The post-decoding processing of the operation code inputs the D code 212 and outputs the R code 214 comprising write reserve of register and memory, entry address of microprogram and parameters for microprogram. In addition, the write reserve of the register or memory is for preventing a wrong address calculation by re-writing the content of the register or memory referred in the address calculation with the instruction preceding on the pipeline.

To avoid a dead lock, the write reserve of the register or memory is performed on an instruction basis rather than on a step code basis.

On the write reserve to the register or memory, detailed description is disclosed in the Japanese Patent Application No. 62-144394 (1987).

The operand address calculation processing inputs the A code 213, performs addition in the operand address calculation unit 104 according to the A code 213 or performs address calculation by combining memory indirect reference, and outputs the result of the calculation as the F cord 215. At this time, conflict check is done in reading-out of the register and the memory attending on the address calculation, and if a conflict is indicated because the preceding instruction has not completed the writing processing to the register or the memory, the processing waits until the preceding instruction completes the write processing in the E stage 205. Checking is made for whether or not the operand address and the address of memory indirect reference can enter the I/O area mapped in the memory.

The EITs detected in the A stage 203 include reserved instruction exception, privilege instruction exception, bus access exception, address conversion exception and debugging trap generated by an operand break point hit at memory indirect addressing. When it is indicated that the D code 212 or the A code 213 itself has caused EIT, the A stage 203 does not perform address calculation processing for that code, and that EIT is transmitted to the R code 214 and the F code 215.

(3.2.4) "Micro ROM Access Stage"

Processing of the operand fetch stage (F stage) 204 is also divided roughly into two parts. One is access processing of the micro ROM, particularly called the R stage 206. The other is operand prefetch processing, particularly called the OF stage 207. The R stage 206 and the OF stage 207, which do not necessarily operate at the same time, operate independently depending on whether or not the memory access right can be acquired.

The micro ROM access processing which is the processing of the R stage 206 is the micro ROM access and micro instruction decoding processing for generating the E code 216 which is an execute control code used for execution in the following E stage 205 for the R code 214. In the case where processing for one R code 214 is decomposed into two or more microprogram steps, the micro ROM is used in the E stage 205, and the following R code 214 waits for micro ROM access. The micro ROM access to the R code 214 is performed when the last micro instruction is executed in the preceding E stage 205. In the data processor of the present invention, almost all of the basic instructions are executed in one microprogram step, therefore, there are many actual cases that the micro ROM access to the R code 214 is performed one after another.

There is no EIT to be detected anew in the R stage 206.

When the R code 214 indicates the EIT of instruction processing re-execution type, the microprogram for that EIT processing is executed, and therefore the R stage 206 fetches the micro instruction according to the R code 214. In case where the R code 214 indicates an odd address jump trap, the R stage 206 transmits it through the E code 216. This is for pre-branch, and in the E stage 205, if no branch is made in that E code 216, an odd address jump trap is generated with the pre-branch being to be effective.

(3.2.5) "Operand Fetch Stage"

The operand fetch stage (OF stage) 207 performs the operand prefetch processing among the above-mentioned two processings performed in the F stage 204.

The operand prefetch processing inputs the F code 215 and outputs the fetched operand and the address thereof as the S code 217. One F code 215 may stride over the word boundary, but designates operand fetching of four bytes or less. The F code 215 also comprises designating of whether or not access to the operand is to be performed, and in the case where the operand address itself or the immediate value calculated in the A stage 203 is transferred to the E stage 205, no operand prefetch is performed, and the content of the F code 215 is transferred as the S code 217. In the case where the operand intended to be prefetched coincides with the operand intended to be write-processed in the E stage 205, no operand prefetching is performed from the memory, but being performed by by-passing it. For the I/O area, the operand prefetch is delayed, and the operand fetch is performed only after all the preceding instructions have been completed.

The EITs detected in the OF stage 207 include a bus access exception, an address conversion exception, and a debugging trap generated by a break point hit to the operand prefetch. When the F code 215 indicates an EIT other than the debugging trap, it is transferred to the S code 217, and no operand prefetch is performed. When the F code 215 indicates a debugging trap, the same processing as the case where no EIT is indicated for that F code 215 is performed, and the debugging trap is transmitted to the S code 217.

(3.2.6) "Execution Stage"

The execution stage (E stage) 205 operates with the E code 216 and the S code 217 taken as inputs. This E stage 205 is a stage for executing instructions, and the whole processings performed in the stages before and in the F stage 204 are pre-processings for the E stage 205. In the case where a jump instruction is executed in the E stage 205 or the EIT processing is started, all the processings from the IF stage 201 to the F stage 204 are disabled. The E stage 205 is controlled by microprograms, and the instruction is executed by executing a series of microprograms starting with the entry address of micrprogram indicated in the R code 214.

Read of the micro ROM and execution of the microinstruction are performed in a pipeline manner. Accordingly, in the case where a branch takes place in the microprogram, a gap (blank) of one microstep is generated. The E stage 205 can also perform pipeline processing of an operand store of four bytes or less and the following microinstruction execution by utilizing the store buffer in the data operation unit 106.

In the E stage 205, the write reserve to the register and the memory performed in the A stage 203 is released after write of the operand.

In the case where a conditional branch instruction generates a branch in the E stage 205, the branch prediction for that conditional branch instruction has been wrong, and therefore rewriting of the branch history is performed.

The EITs detected in the E stage 205 include bus access exception, address conversion exception, debugging trap, odd address jump trap, reserve function exception, wrong operand exception, reserve stack format exception, zero division trap, unconditional trap, conditional trap, delayed context trap, external interruption, delayed interruption, reset interruption and system faults.

The EITs detected in the E stage 205 are all EIT-processed, but the EITs which are detected between the IF stage 201 and the F stage 204 before the E stage and are reflected in the R code 214 or the S code 217 are not necessarily EIT-processed. All the EITs which are detected among from the IF stage 201 to the F stage 204, but do not reach the E stage 205 because the preceding instruction has executed a jump instruction in the E stage 205 or the like are all canceled. The instruction having caused that EIT is assumed to have not been executed from the beginning.

The external interruption and the delayed interruption are accepted directly to the E stage 205 at a pause of the instruction, and necessary processing is executed by microprograms. Processings of other various EITs are performed by micrprograms.

(3.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty stage, and when the input latch of the next stage is not empty, the pipeline stage is also put in the waiting state (output waiting). If the required memory access right cannot be acquired, or wait is inserted into the memory access under processing, or another pipline conflict occurs, the processing itself of each stage is delayed.

(4) "Exchanging of the Register Number Specifying Field"

Description is made hereinafter according to a block diagram of a schematic configuration of pipeline stages of the data processor of the present invention as shown in FIG. 29 and a block diagram of the whole configuration of the data processor of the present invention as shown in FIG. 28.

As described above, an instruction decoding unit 102 has a two-part configuration, and a first decoder 86 as the first decoding part is controlled by the D stage 202 as shown in FIG. 29, and a second decoder 87 as the second decoding part is controlled by the A stage 203. For example, for the instruction "MOV:L R1 R2" which is the L-format instruction (equivalent to the A format instruction of the conventional example as described above) and is a transfer instruction from the register R1 to the register R2, the instruction code as shown in FIG. 5 becomes "—0010 RR—01 0001", and for the instruction "MOV:S R1 R2" which is the S-format instruction (equivalent to the B format instruction of the conventional example as described above) and is a transfer instruction from the register R1 to the register R2, the instruction code as shown in FIG. 5 becomes "—0001 RR—01 0010". Here, the initial "—" of the both codes is an operation code showing whether the L-format instruction or the S-format instruction, and "0001" shows R1, "0010" shows R2 and "01" shows the register direct addressing mode, respectively.

Figure 31:
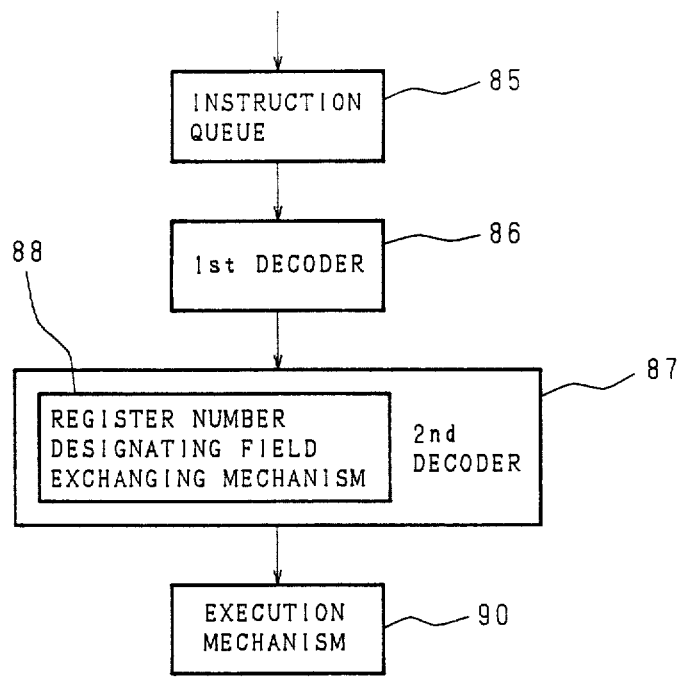
FIG. 31 is a block diagram showing a main part including a register number designating field exchanging mechanism of the data processor of the present invention.

FIG. 31 is a block diagram showing a main part including a register number designating field exchanging mechanism of the data processor of the present invention.

Instructions are read from the instruction queue 85, and the above-mentioned L-format instruction. "MOV:L R1 R2" and S-format instruction "MOV:S R1 R2" are decoded independently by the first decoder 86, and as an intermediate decoding result, "!! 0010 ?? 0001 0" is outputted for the L-format and "!! 0001 ?? 0010 1" is outputted for the S-format, respectively. Here, "!!" and "??" are the first decoding result of other field information excluding the register number designating field. The final bit information ("1" or "0") shows whether or not the register number designating field is to be exhanged, and when this bit has been set, that is, "1", the register number designating fields are exchanged.

The first decoding result of these L-format and S-format are decoded by the second decoder 87, and according to the bit information showing whether or not the register number designating fields of the first decoding result are to be exchanged, the register number designating fields are exchanged with each other by a register number designating field exchanging means 88 for the S-format.

Then, the bit information showing whether or not the register number designating fields are to be exchanged is used only for this exchanging processing, and is not contained in the second decoding result given to an execution mechanism 90. Consequently, the second decoding result becomes "== 0010 ++ 0001" for the L-format and "== 0010 ++ 0001" for the S-format, becoming the same. Accordingly, in the execution mechanism 90, the data transfer from the register R1 to the register R2 is performed by the same microprogram for the both instructions. This means that the processing can be performed by one micro-program for the two instructions of the L-format instruction and the S-format instruction.

As described above, in the data processor of the present invention, the instruction decoding means is divided into the first and the second instruction decoding parts, and the register number designating fields of one of data transfer instructions are exchanged with each other by the second instruction decoding part, and thereby the same micro-program as for the other instruction can be used, and therefore the micro-program can be curtailed, and the memory area of the micro-ROM can be utilized effectively.

As this invention may be embodied in several forms without departing from the spirit of essential characteristics thereof, the present embodiment is therefore illustrative and not restrictive, since the scope of the invention is defined by the appended claimed rather than by the description preceding them, and all changes that fall within the meets and bounds of the claims, or equivalence of such meets and bounds thereof are therefore intended to be embraces by the claims.

What is claimed is:

1. A data processor which has a pipeline processing mechanism comprising an instruction fetch means for fetching instructions including a first data transfer instruction having a format describing a destination operand designating field and a source operand designating field disposed in a first ordered sequence and also including an addressing mode designating field and a second data transfer instruction having a format describing the source operand designating field and the destination operand designating field disposed in a second ordered sequence opposite said first ordered sequence and also including an addressing mode designating field, an instruction decoding means for decoding the instruction fetched by said fetch means, and an instruction execution means for executing the instruction according to the decoding result of said instruction decoding means, wherein said instruction decoding means comprises:

a first instruction decoding part which decodes the instruction fetched by said instruction fetch means and produces an intermediate code including said source and destination operand designating fields in said first or second sequence if the fetched instruction is said first or second data transfer instruction respectively and including a parameter having a first value when the instruction fetched is said first data transfer instruction and a second value when the instruction fetched is said second data transfer instruction; and means, coupled to receive said intermediate code and controlled by said first parameter, for exchanging said source operand and destination operand designating fields included in said intermediate code when said parameter has said first value so that said first and second data transfer instructions are processed identically in the instruction execution means when the addressing mode designating field designates register direct addressing.

* * * * *